(12) United States Patent
Jackson

(10) Patent No.: US 7,388,480 B1
(45) Date of Patent: Jun. 17, 2008

(54) SAFETY LIGHTS FOR MULTIPLE-AXLE VEHICLES

(76) Inventor: B. Stephen Jackson, 217 Whispering Hills, Hot Springs, AR (US) 71901

( * ) Notice: Subject to any disclaimer, the term of this patent is extended or adjusted under 35 U.S.C. 154(b) by 180 days.

(21) Appl. No.: 11/418,509

(22) Filed: May 4, 2006

(51) Int. Cl.
*B60Q 1/26* (2006.01)

(52) U.S. Cl. ............... 340/463; 340/468; 340/475; 116/35 R

(58) Field of Classification Search ............ 340/475
See application file for complete search history.

(56) References Cited

U.S. PATENT DOCUMENTS

| | | | |
|---|---|---|---|
| 4,115,757 A | 9/1978 | Blahunka | 340/32 |
| 4,325,318 A | 4/1982 | Kitrell | 116/28 |
| 4,449,167 A | 5/1984 | Cohen | 362/269 |
| 4,953,065 A | 8/1990 | Kao | 362/83 |
| 5,209,559 A * | 5/1993 | Ruppel | 362/485 |
| 5,607,221 A | 3/1997 | Justus | 362/283.3 |
| 6,043,739 A * | 3/2000 | Henderson | 340/468 |
| 6,133,851 A | 10/2000 | Johnson | 340/901 |
| 6,709,141 B1 | 3/2004 | Sisti | 362/543 |
| 6,870,473 B2 * | 3/2005 | Brown, Jr. | 340/463 |
| 7,119,672 B2 * | 10/2006 | Subbaraman | 340/465 |
| 2007/0120654 A1 * | 5/2007 | Walton | 340/431 |

* cited by examiner

*Primary Examiner*—George Bugg
(74) *Attorney, Agent, or Firm*—Keisling Pieper & Scott, PLC; Meredith K. Lowry

(57) ABSTRACT

A light assembly for a multiple-axle or movable axle vehicle with a vertical and horizontal arrangement of lights adapted to enhance visibility of the vehicle as well as the wheels and axles of the vehicle.

20 Claims, 4 Drawing Sheets

SAFETY LIGHTS FOR MULTIPLE-AXLE VEHICLES

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to the field of illumination devices. More specifically, the present invention is drawn to a warning light system for a motor vehicle 2. Description of the Known Art As will be appreciated by those skilled in the art, luminous devices are located on motor vehicles to aid with visibility of these vehicles for other drivers. The Department of Transportation dictates lighting requirements for tractors and semi-trailers under the Federal Motor Carriers Safety regulations. These regulations generally cover types of lights, position requirements, candle power, and required times of use for specific lights. Patents disclosing information relevant to luminous devices located on motor vehicles include U.S. Pat. No. 4,115,757, issued to Blahunka on Sep. 19, 1978; U.S. Pat. No. 4,325,318, issued to Kitrell on Apr. 20, 1982; U.S. Pat. No. 4,449,167, issued to Cohen on May 15, 1984; U.S. Pat. No. 5,607,221, issued to Justus on Mar. 4, 1997; U.S. Pat. No. 6,133,851, issued to Johnson on Oct. 17, 2000; U.S. Pat. No. 6,709,141, issued to Sisti on Mar. 23, 2004. Each of these patents are hereby expressly incorporated by reference in their entirety.

U.S. Pat. No. 4,449,167, issued to Cohen on May 15, 1984 entitled Adjustable vehicle safety light. The abstract provides the following information. The object of the present invention is an auxiliary safety rear light assembly for vehicles which can be adhesively mounted at any position on the rear window of a car or truck. Another object of the present invention is an auxiliary safety rear light assembly which can be adjusted along a horizontal axis so as to be mountable parallel to the road regardless of the angle which the vehicle rear window makes to the road. Still another object of the present invention is an auxiliary safety rear light assembly for vehicles comprising a lightable area which will illuminate in response to and signal vehicle actions, pivot means on either end of the lightable area to pivot the lightable area on its horizontal axis, a mounting bracket having two dependent sides and a foot perpendicular to each of such sides, each side having means to accept a lightable area pivot means and locking means to lock the pivot means and hold the lightable area in a desired position relative to such sides, and each foot having adhesive means on a surface thereof to fixedly attach the auxiliary safety rear light assembly to the vehicle.

U.S. Pat. No. 4,953,065, issued to Kao on Aug. 28, 1990 entitled Brake light device mounted on truck fender. The abstract provides the following information. A brake light device mounted on truck fender providing brake light warning signal day and night to promote driving security, including a base, a circuit board, a reflecting mirror, a set of wires and a light shade, wherein the base is formed with a central rectangular recess having a peripheral step portion, the circuit board being disposed on the step portion, and the reflecting mirror being disposed on the step portion, and the reflecting mirror being disposed on the circuit board while via screws, the light shade being associated with the base to envelope the circuit board and reflecting mirror, forming an assembly, which is mounted on the lower end of a fender by screws.

U.S. Pat. No. 5,607,221, issued to Justus on Mar. 4, 1997 entitled Hook-up light for a truck tractor. The abstract provides the following information. A device for mounting on the rear wall of a truck tractor including a housing and a lamp pivotally mounted on the housing, for illuminating a working area between the tractor and a trailer during hookup or to provide an additional safety warning light behind the tractor. The housing contains a receptacle and a pair of glad hand brackets mounted on side walls of the housing for retaining the plug end of an electrical power cord and the coupling ends of a pair of air pressure lines, respectively, when disconnected from the trailer. One of the male prongs of the receptacle is electrically connected to a switch mounted within the cab of the tractor for illuminating the lamp. This switch normally actuates one of the trailer accessories, such as its marking light, when the power cord is connected to the trailer.

U.S. Pat. No. 6,133,851, issued to Johnson on Oct. 17, 2000 entitled Truck light warning system. The abstract provides the following information. A truck light warning system for automatically alerting a driver near a truck that they are either following too closely or within a truck's blind spots. The inventive device includes a rear sensor, a front sensor, a pair of side sensors, an engine control module (ECM), an instrument control panel (ICP), a rear indicator, a front indicator and a pair of side indicators all electrically connected. A plurality of side movement lights are electrically connected to the ECM for informing the driver of a vehicle that they should drive past the side of the tractor and trailer. A plurality of strobe lights may be included that are activated when the fog lights of the tractor are activated for warning drivers during inclimate weather conditions. When a vehicle is in one of the four blind spots surrounding the tractor and trailer, the ECM activates the appropriate indicator to warn the driver that they are in a blind spot or following too closely. The ECM is preferably programmable for allowing the programming of various messages to be displayed upon the indicators.

U.S. Pat. No. 6,709,141, issued to Sisti on Mar. 23, 2004 entitled Automotive warning light. The abstract provides the following information. A warning illumination system adapted to be mounted on a motor vehicle (automobile, truck, motorcycle, etc.). In a preferred embodiment, the system is designed to project a single or a pair of light beams forwardly and angularly from the front of the vehicle. As contemplated the beam(s) is projected a distance of fifty to one hundred feet in front of the vehicle and at a horizontal angle across the vehicle which may range from forty-five to sixty degrees. For maximum effectiveness, it has been determined that the beam should be projected at a vertical angle so that it intersects the road at approximately a thirty degree angle. The thus projected beam reaches forward and across the lane of traffic, making the extreme end of the beam visible to an oncoming driver approaching from a hidden curve or blind corner. The beam is visible to the oncoming driver critical seconds before the approaching vehicle is visible. The beam can be directed either to the right or left depending on whether the vehicle is approaching a right hand or a left hand curve.

As known in the art, conspicuity tape has been traditionally used to aid the visibility of trailers. However, the use of the conspicuity tape does not prevent a number of accidents. When a vehicle's lights are directed towards conspicuity tape located on a trailer, the light is typically reflected back toward the motorist to show an outline of the frame of the trailer. The intensity of the reflection of the tape is magnified when light is oriented more directly towards the tape. However, when the angle of the trailer moves from ninety degrees, either by increase or decrease of the angle, less light is directed toward the conspicuity tape from the motorist's vehicle causing less light to be reflected. The reflection of light is also impeded by the accumulation of dirt and debris on tractor-trailers which are typically used in rural settings. Thus, conspicuity tape is not always effective in alerting motorists to the frame of a trailer. A single amber light on the rear side corners of the trailer have also been used on trailers. However, these lights are easily muted since they are located behind the more intense headlights of the tractor. Therefore, there is a need in the art to improve the visibility of trailers.

A common traffic scenario reveals the need in the art for the disclosed invention. This situation occurs when an articulated vehicle is negotiating a left turn from a roadway where cross-traffic has the right-of-way. The time needed to complete the left turn (positioned completely in the intended lane) from a stopped position is increased dramatically for a tractor-trailer as opposed to the typical passenger vehicle. The average passenger vehicle executes a left turn from three to five seconds while a tractor pulling a forty to fifty-three foot trailer will take fifteen to twenty seconds to execute the same turn. In this fifteen to twenty second time period, an approaching vehicle on a roadway with a speed limit of 55 miles an hour can travel at least 1200 feet. Therefore, many vehicles will be too far away from the intersection at the time the trailer begins the turn to recognize the obstruction in the road. In low light conditions, these motorists will have difficulties recognizing the obstruction before it becomes a problem.

Tractor-trailer drivers making left turns steer the tractor generally straight across the two lanes of travel, then turn sharply to their left and point their tractor straight toward vehicles approaching from their left. This is normally done so that the left rear axles of their trailer, which track substantially to the inside of the turn, will clear physical obstacles. A tractor will accomplish the straight alignment with the roadway within approximately one-third of the total time necessary to complete the turn, thus leaving thirteen seconds that the trailer is pointed straight down the roadway before completely clearing the oncoming lane of traffic.

The trailer effectively vanishes from an oncoming motorist's field of vision once the tractor's headlights are pointed directly toward the motorist. The motorists on oncoming vehicles who approached during the thirteen seconds after the tractor has pointed straight will only see headlights of an oncoming vehicle which is not in their intended path of travel. If the motorists enter the intersection less than thirteen seconds after the tractor points in their direction, they either underride the side of the trailer or strike the tandem axles on the trailer. Obviously, this type of collision usually causes severe personal injuries or death to the occupants of those vehicles. Many times in these type accidents, there is no evidence of any braking prior to the collision. This visibility scenario is also presented when a tractor/semi-trailer backs across an oncoming lane to dock trailers for delivery or pick-up.

Based upon this scenario, there is a need in the art to further enhance visibility of the trailer's location. The prior art fails to teach a light system for multiple-axle vehicles oriented to alert motorists of the position of a trailer from a multitude of angles. Thus, it may be seen that these prior art patents are very limited in their teaching and utilization, and an improved light system is needed to overcome these limitations.

SUMMARY OF THE INVENTION

The present invention is directed to an improved light configuration for multiple axle vehicles. In accordance with one exemplary embodiment of the present invention, a light configuration for a trailer is provided.

As discussed above, a trailer effectively vanishes from an oncoming motorist's field of vision once the tractor's headlights are pointed directly toward the motorist. If motorists enter the intersection after the tractor points in their direction but before the trailer clears the intersection, those motorists either underride the side of the trailer or strike the tandem axles on the trailer. Obviously, this type of collision usually causes severe personal injuries or death to the occupants of those vehicles.

It is an object of the present invention to provide an indicator of a trailer's position.

It is a further object of the present invention to illuminate the axles of a trailer.

It is a further object of the present invention to provide a constant indicator which is less likely to be obscured by dirt or debris.

It is an object of the present invention to provide an indicator of a trailer's position which alerts motorists despite the angle of the approaching motorist; or the articulation of the tractor/semi-trailer.

It is an object of the present invention to provide an indicator of obstruction within the road to alert motorists.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
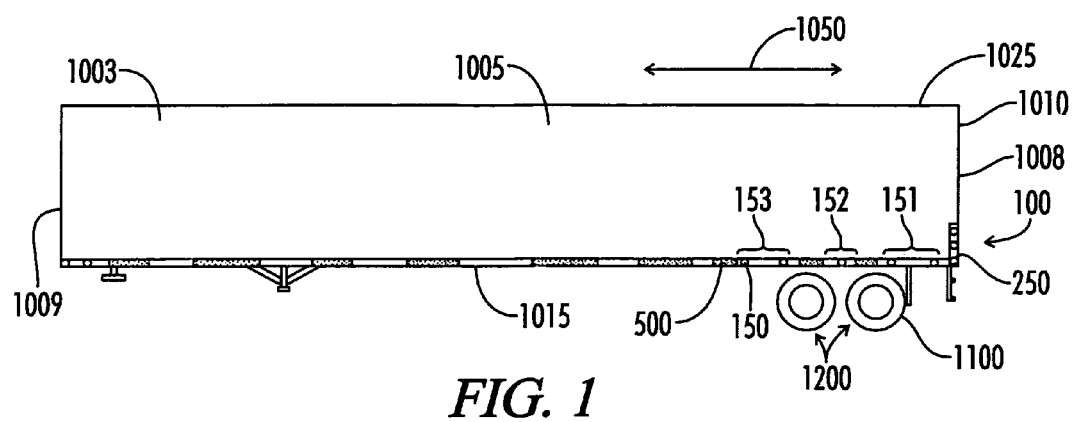
FIG. 1 is a left side elevational view of a trailer showing the safety lights.

As shown in FIG. 1 of the drawings, one exemplary embodiment of the present invention is generally shown as a light assembly 100 for a trailer 1000 or a multiple-axle vehicle. As contemplated by the present invention, the light assembly 100 is generally installed upon the left side 1005 of a vehicle, trailer 1000, or a flat-bed trailer 1001 to aid against the type of accidents discussed above. However, the light assembly may also be installed upon the right side of a trailer 1000 or flat-bed 1001. It is envisioned that the light assembly may be incorporated with the trailer during manufacture or at a later date as an after-market addition.

As shown in FIG. 1, the light assembly 100 provides an additional safety light element for multiple-axle trailer 1000. A multiple-axle trailer generally includes a trailer body 1003, axle assemblies 1200, and wheels 1100. The trailer body 1003 generally includes a front end 1009, a back end 1008, a left side 1005, a right side 1006, a top 1025, and a base 1015. Trailer bodies 1003 range between 28 feet to 53 feet in length of the longitudinal axis 1050 of the trailer.

Figure 2:
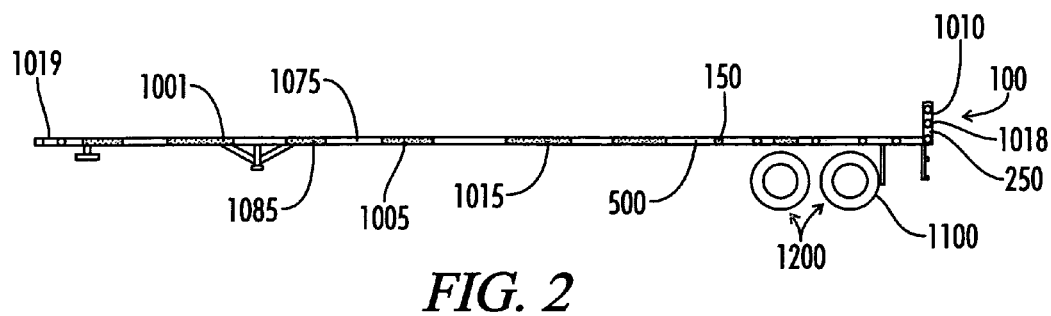
FIG. 2 is a left side elevational view of a flat-bed trailer showing the safety lights.

As shown in FIG. 2, the light assembly 100 provides an additional safety light element for multiple-axle flat-bed trailer 1001. A flat-bed trailer generally includes a trailer bed 1075, axle assemblies 1200, and wheels 1100. The flat-bed body 1075 generally includes a front end 1019, a back end 1018, a left side 1005, a right side 1016, and a base 1085. Flat-bed bodies 1075 range between 40 feet to 53 feet in length of the longitudinal axis 1050 of the flat-bed trailer.

Figure 3:
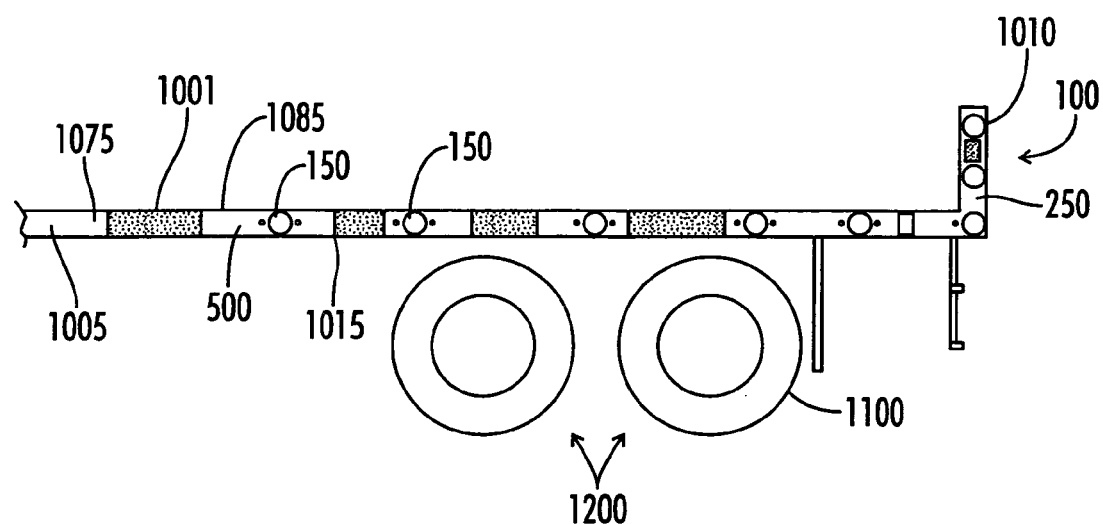
FIG. 3 is a left side elevational view of the safety lights.

As shown in FIGS. 1-3, the light assembly 100 generally includes a vertical bank 250 of lights and a horizontal bank 500 of lights placed on the right side 1006 or left side 1005 of the trailer. Both the vertical bank 250 and horizontal bank 500 include a number of lights 150. As will be appreciated by those skilled in the art, small lights 150 on trailers 1000 such as these are sometimes mistaken for other objects alongside the road, such as drive-way markers. Therefore, there is a need to have number of these lights 150 included in the vertical bank 250 and horizontal bank 500 for use in correctly identifying the outline of the trailer 1000.

Each light 150 is connected to the other lights of the vertical bank 250 and horizontal bank 500 placed on the same side 1005, 1006 of the trailer 1000. In this manner, the light assembly 100 can provide a constant illumination or an alternating illumination of lights consistently for each light 150 on that side 1005, 1006 of the trailer 1000. In the preferred embodiment, the lights 150 are connected to the wiring for the turn signal of the trailer 1000 or flat-bed 1001 so that the lights 150 will blink with the alternating illumination of the turn signal. In another embodiment, the lights 150 of each side 1005, 1006 of the trailer 1000 are connected to provide a consistent illumination on both sides of the trailer 1000.

As shown in FIGS. 1-3, the vertical bank 250 of the lights is generally located at the terminal end 1010 of the trailer base 1015. The vertical bank generally extends from the trailer base 1015 upwards towards the top 1025 of the trailer. The vertical bank is approximately three inches wide. In a preferred embodiment, the vertical bank 250 of lights includes two lights 150 and extends upward from the base 1015 approximately two feet. In other embodiments, the vertical bank 250 of lights will extend upwards more than two feet depending upon the trailer configuration. The vertical element for the light assembly 100 enables a motorist to identify the outline of an object rather than presenting a field of lights. As will be appreciated by those skilled in the art, lights 150 can be misleading to motorists as they do not provide form to obstructions but merely identify the presence of an obstruction. Thus, the present invention seeks to provide structure to obstacles for a passing motorist. The vertical bank 250 further provides a terminal indicator to a motorist to show the extent of the trailer 1000.

As shown in FIGS. 1-3, the horizontal bank 500 of the lights is generally located on the trailer base 1015. The horizontal bank 500 generally extends along the trailer base 1015 or the longitudinal axis of the trailer 1000 from a point in front of the first axle assembly or wheel assembly 1100 to the terminal end 1010 of the trailer base 1015. In a preferred embodiment, the horizontal bank 500 of lights includes six lights 150 and extends ten feet along the longitudinal axis 1050 of the trailer 1000. In other embodiments featuring movable axles, the horizontal bank 500 includes more than six lights 150 and extends more than ten feet along the longitudinal axis 1050 of the trailer 1000. The horizontal element for the light assembly 100 enables a motorist to identify the position of the axle assembly 1200 and wheels 1100 from a distance. The lights 150 of the horizontal bank 500 are positioned along the trailer base 1015 proximate the axle assembly 1200 and wheels 1100. Lights 150 are generally placed with at least two lights 153 anterior the axle assembly 1200 and wheels 1100. Further, at least one light 152 is positioned between the axle assemblies 1200. Additionally, at least two lights 151 are positioned posterior the axle assemblies 1200 at the terminal end 1050 of the trailer 1000. In a preferred embodiment, lights 150 are spaced on either side of the axle assembly or wheel assembly 1100. In another embodiment, the lights 150 are spaced equidistant from one another on either side of the axle assembly or wheel assembly 1100.

Figure 4:
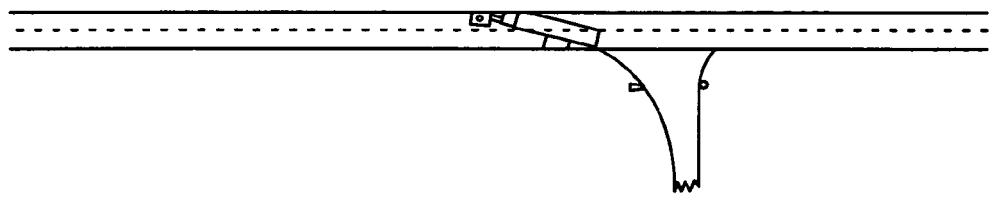
FIG. 4 is a top plan view of an accident involving a trailer.
Figure 5:
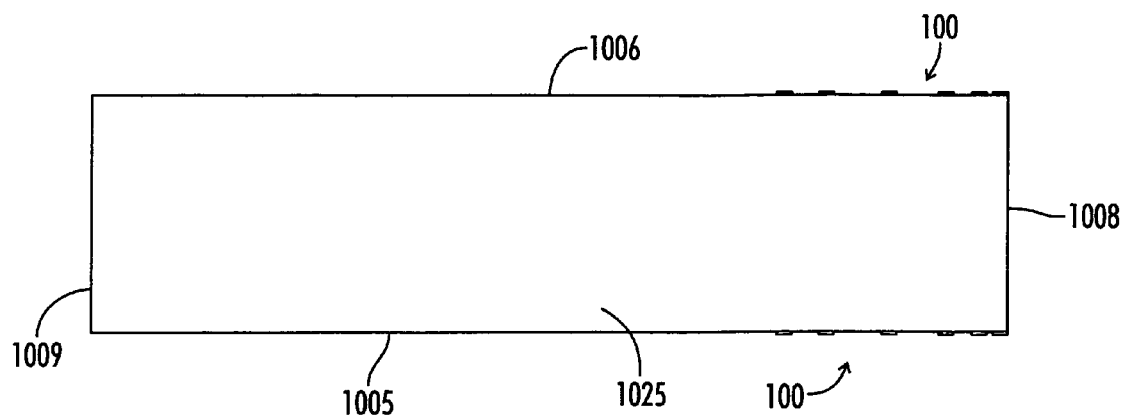
FIG. 5 is a top plan view of a trailer showing the safety lights.
Figure 6:
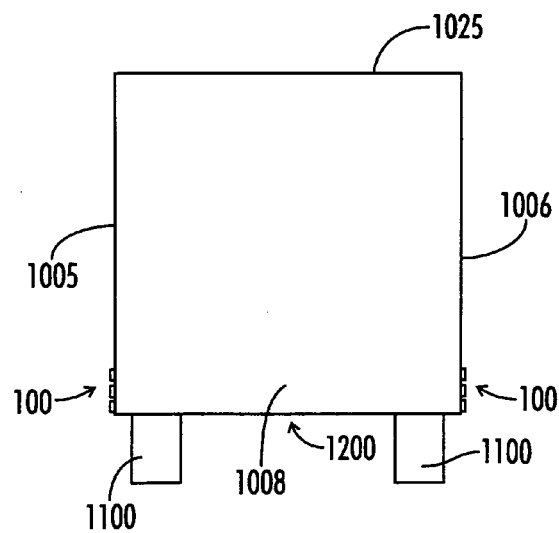
FIG. 6 is a rear elevational view of the same.

As shown in FIG. 4, collisions between automobiles and trailers occur when motorists are not aware of the presence of the trailer within their lane of travel. The light assembly 100 shown in FIGS. 1-3 and FIGS. 5-8 aids in illuminating the wheels 1100 and axles 1200 of a trailer 1000 to diminish the likelihood of the collision shown in FIG. 4.

Figure 7:
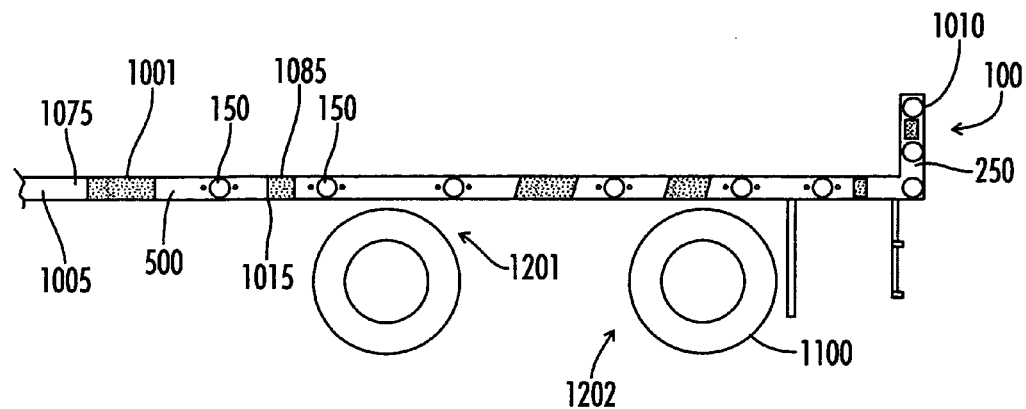
FIG. 7 is a left side elevational view of a flat-bed trailer with an axle moved forward.
Figure 8:
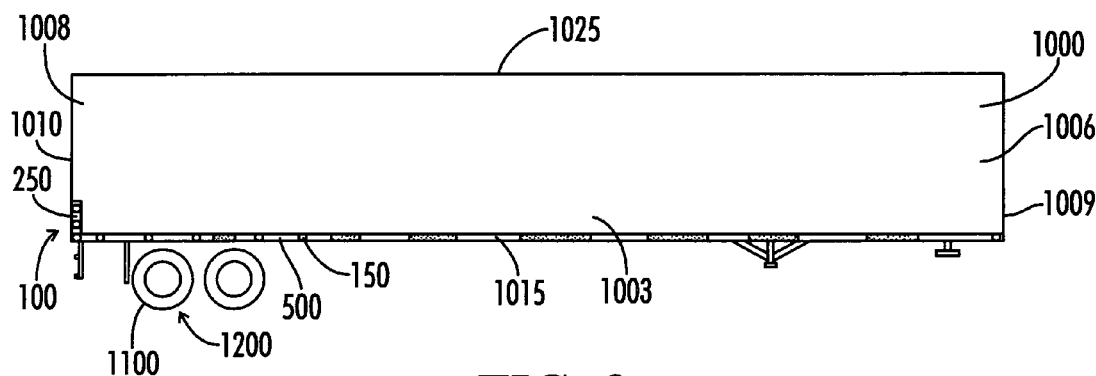
FIG. 8 is a right side elevational view of a trailer showing the safety lights.

As shown in FIG. 7, multiple-axle assemblies are utilized to maintain a weight distribution of the load hauled by the trailer 1000 or flat-bed 1001 on the individual wheels 1100. For some loads, it is necessary to move the axles 1200 forward or rearward along the longitudinal axis 1050 of the trailer to maintain the weight distribution. In some situations, the moved axle 1200 must be moved a substantial distance from the other axles 1200. In those situations, the forward axle 1201 may appear to an approaching motorist as the rearward axle 1202 of the trailer 1000. The present invention recognizes a need in the art to illuminate the axle assemblies 1200 of trailers 1000 in all of their positions. Accordingly, in a preferred embodiment, lights 150 are generally placed on the horizontal bank 500 with at least two lights 153 anterior the first axle assembly 1201. Further, at least one light 152 is positioned between the forward axle 1201 and any subsequent rearward axle 1202. In this manner, lights 150 may continue down the length of the longitudinal axis 1050 of the trailer 1000 in between a multitude of forward 1201 and rearward 1202 axles. Additionally, at least two lights 151 are positioned posterior the rearward axle 1202 at the terminal end 1050 of the trailer 1000.

Reference numerals used throughout the detailed description and the drawings correspond to the following elements:

Light assembly 100
Light 150
Anterior lights 153
Middle lights 152
Posterior lights 151
Vertical bank 250
Horizontal bank 500
Trailer 1000
Flat-bed 1001
Body 1003
Left side 1005
Right side 1006
Back end 1008
Front end 1009
Terminal end 1010
Trailer base 1015
Back end 1018
Front end 1019
Trailer top 1025
Longitudinal axis 1050
Bed 1075
Base 1085
Wheels 1100
Axle assembly 1200
Forward axle 1201
Rearward axle 1202

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically referring to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures.

What is claimed is:

1. A light assembly for a side of an elongated vehicle having multiple axles or movable axles where the light assembly illuminates an effective portion of the longitudinal axis of the vehicle to alert approaching motorists of the presence of the vehicle and particularly the axles, the light assembly comprising:

a plurality of lights connected to each other such that the illumination of each light is consistent with the illumination of the remaining lights and connected to the turn signal of the vehicle for the corresponding vehicle side of said light assembly, such that the illumination of the turn signal causes illumination of said plurality of lights consistent with the illumination of the turn signal;

a vertical bank including a portion of said plurality of lights positioned at the terminal end of a vehicle base located on the side along the longitudinal axis of the vehicle and extending upwards from the base of the vehicle perpendicular to the base of the vehicle;

a horizontal bank including a remaining portion of said plurality of lights positioned on said vehicle base such that at least one light of said plurality of lights is positioned anterior to said at least one axle assembly and at least one light of said plurality of lights is positioned posterior to said at least one axle assembly of the vehicle, said horizontal bank positioned proximate to said at least one axle assembly of the vehicle such that at least one light of said plurality of lights is positioned on both sides of each said at least one axle assembly, wherein said vertical bank and said horizontal bank of said plurality of lights produce an illuminated outline of a rear corner of the vehicle and said plurality of lights sufficiently enhance the visibility of the vehicle and sufficiently enhance visibility of said at least one axle assembly even when a movable axle assembly is moved forwardly or rearwardly along the longitudinal axis of the vehicle.

2. The light assembly of claim 1, wherein said horizontal bank is positioned proximate to at least two axle assemblies of the vehicle such that at least one light of said plurality of lights is positioned on both sides of each said at least two axle assemblies.

3. The light assembly of claim 2, wherein said horizontal bank includes at least two lights of said plurality of lights, such that one light of said at least two lights is positioned anterior to said at least one axle assembly of the vehicle and one light of said at least two lights is positioned posterior to said at least one axle assembly of the vehicle.

4. The horizontal bank of claim 1, wherein said at least one light of said plurality of lights is positioned equidistantly on both sides of each said at least one axle assembly.

5. The light assembly of claim 1, wherein said vertical bank includes at least three lights of said plurality of lights, such that one light of said at least three lights is positioned at the terminal end of a vehicle base located on the side along the longitudinal axis of the vehicle and two lights of said at least three lights are positioned upwards from the base of the vehicle perpendicular to the base of the vehicle.

6. The light assembly of claim 1, wherein said horizontal bank is positioned proximate to at least one forwardly-positioned movable axle assembly of the vehicle such that at least one light of said plurality of lights is positioned on both sides of said at least one forwardly-positioned movable axle assembly.

7. The light assembly of claim 1, wherein said horizontal bank is positioned proximate to at least one rearwardly-positioned movable axle assembly of the vehicle such that at least one light of said plurality of lights is positioned on both sides of said at least one rearwardly-positioned movable axle assembly.

8. A light assembly for a side of an elongated vehicle having multiple axles or movable axles where the light assembly illuminates the axles of the vehicle to alert approaching motorists of the presence of the vehicle, the light assembly comprising:

a plurality of lights connected to each other such that the illumination of each light is consistent with the illumination of the remaining lights;

a vertical bank including a portion of said plurality of lights positioned at the terminal end of a vehicle base located on the side along the longitudinal axis of the vehicle and extending upwards from the base of the vehicle perpendicular to the base of the vehicle;

a horizontal bank including a remaining portion of said plurality of lights positioned on said vehicle base such that at least one light of said plurality of lights is positioned anterior to said at least one axle assembly and at least one light of said plurality of lights is positioned posterior to said at least one axle assembly of the vehicle, said horizontal bank positioned proximate to said at least one axle assembly of the vehicle such that at least one light of said plurality of lights is positioned on both sides of each said at least one axle assembly, wherein said vertical bank and said horizontal bank of said plurality of lights sufficiently enhance the visibility of the vehicle and sufficiently enhance visibility of said at least one axle assembly even when a movable axle assembly is moved forwardly or rearwardly along the longitudinal axis of the vehicle.

9. The light assembly of claim 8, wherein said horizontal bank is positioned proximate to at least two axle assemblies of the vehicle such that at least one light of said plurality of lights is positioned on both sides of each said at least two axle assemblies.

10. The light assembly of claim 9, wherein said horizontal bank includes at least two lights of said plurality of lights, such that one light of said at least two lights is positioned anterior to said at least one axle assembly of the vehicle and one light of said at least two lights is positioned posterior to said at least one axle assembly of the vehicle.

11. The light assembly of claim 8, wherein said plurality of lights are connected to the turn signal of the vehicle such that the illumination of the turn signal causes illumination of said plurality of lights consistent with the illumination of the turn signal.

12. The light assembly of claim 8, wherein said vertical bank includes at least three lights of said plurality of lights, such that one light of said at least three lights is positioned at the terminal end of a vehicle base located on the side along the longitudinal axis of the vehicle and two lights of said at least three lights are positioned upwards from the base of the vehicle perpendicular to the base of the vehicle.

13. The light assembly of claim 8, wherein said horizontal bank is positioned proximate to at least one forwardly-positioned movable axle assembly of the vehicle such that at least one light of said plurality of lights is positioned on both sides of said at least one forwardly-positioned movable axle assembly.

14. The light assembly of claim 8, wherein said horizontal bank is positioned proximate to at least one rearwardly-positioned movable axle assembly of the vehicle such that at least one light of said plurality of lights is positioned on both sides of said at least one rearwardly-positioned movable axle assembly.

15. A light assembly for a side of an elongated vehicle having multiple axles or movable axles where the light assembly illuminates the axles of the vehicle to alert approaching motorists of the presence of the vehicle, the light assembly comprising:

a plurality of lights connected to each other such that the illumination of each light is consistent with the illumination of the remaining lights;

a vertical bank including a portion of said plurality of lights positioned at the terminal end of a vehicle base located on the side along the longitudinal axis of the vehicle;

a horizontal bank including a remaining portion of said plurality of lights positioned on said vehicle base such that at least one light of said plurality of lights is positioned anterior to said at least one axle assembly and at least one light of said plurality of lights is positioned posterior to said at least one axle assembly of the vehicle, said horizontal bank positioned proximate to said at least one axle assembly of the vehicle such that at least one light of said plurality of lights is positioned on both sides of each said at least one axle assembly, wherein said vertical bank and said horizontal bank of said plurality of lights sufficiently enhance the visibility of the vehicle and sufficiently enhance visibility of said at least one axle assembly even when a movable axle assembly is moved forwardly or rearwardly along the longitudinal axis of the vehicle.

16. The light assembly of claim 15, wherein said horizontal bank is positioned proximate to at least two axle assemblies of the vehicle such that at least one light of said plurality of lights is positioned on both sides of each said at least two axle assemblies.

17. The light assembly of claim 16, wherein said horizontal bank includes at least two lights of said plurality of lights, such that one light of said at least two lights is positioned anterior to said at least one axle assembly of the vehicle and one light of said at least two lights is positioned posterior to said at least one axle assembly of the vehicle.

18. The light assembly of claim 15, wherein said plurality of lights are connected to the turn signal of the vehicle such that the illumination of the turn signal causes illumination of said plurality of lights consistent with the illumination of the turn signal.

19. The light assembly of claim 15, wherein said horizontal bank is positioned proximate to at least one forwardly-positioned movable axle assembly of the vehicle such that at least one light of said plurality of lights is positioned on both sides of said at least one forwardly-positioned movable axle assembly.

20. The light assembly of claim 15, wherein said horizontal bank is positioned proximate to at least one rearwardly-positioned movable axle assembly of the vehicle such that at least one light of said plurality of lights is positioned on both sides of said at least one rearwardly-positioned movable axle assembly.

* * * * *